US006541555B1

(12) United States Patent
Roetcisoender

(10) Patent No.: US 6,541,555 B1
(45) Date of Patent: Apr. 1, 2003

(54) HIGH-DENSITY LOW EPSILON BALLAST MATERIALS

(75) Inventor: Kirk T. Roetcisoender, Palmddale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/466,891

(22) Filed: Dec. 20, 1999

(51) Int. Cl.⁷ .................................................. C08K 5/04
(52) U.S. Cl. ........................ 524/398; 524/404; 524/420; 524/430
(58) Field of Search .............................. 524/398, 401, 524/402, 404, 406, 413, 423, 424, 427, 430, 431, 440

(56) References Cited

U.S. PATENT DOCUMENTS

| | | |
|---|---|---|
| 4,006,479 A | 2/1977 | LaCombe |
| 4,024,318 A | 5/1977 | Forster et al. |
| 4,173,018 A | 10/1979 | Dawson et al. |
| 4,767,799 A | 8/1988 | Thorsrud |
| 4,879,065 A | 11/1989 | Sterzel |
| 4,891,399 A * | 1/1990 | Ohkawa et al. ............. 523/200 |
| 4,963,291 A | 10/1990 | Bercaw |
| 5,280,086 A * | 1/1994 | Kawamoto et al. ......... 525/398 |
| 5,389,434 A | 2/1995 | Chamberlain et al. |
| 5,502,099 A | 3/1996 | Wallace |
| 5,668,070 A | 9/1997 | Hong et al. |
| 5,786,785 A | 7/1998 | Gindrup et al. |
| 5,853,889 A | 12/1998 | Joshi et al. |
| 5,869,880 A * | 2/1999 | Grill et al. .................. 257/522 |
| 6,048,379 A * | 4/2000 | Bray et al. .................... 75/229 |
| 6,187,427 B1 * | 2/2001 | Taylor-Smith et al. ... 428/305.5 |

* cited by examiner

Primary Examiner—Edward J. Cain
Assistant Examiner—Katarzyna Wyrozebski
(74) Attorney, Agent, or Firm—Lockheed Martin Corporation

(57) ABSTRACT

High density, low epsilon ballast materials are disclosed. The materials comprise dielectric ceramic particles in a polymeric matrix. The composite material possesses higher density/dielectric ratios in comparison with conventional ballast materials.

27 Claims, 2 Drawing Sheets

COMPARISON OF MEASURED REAL EPSILON vs LOADING % AND FILLER

HIGH-DENSITY LOW EPSILON BALLAST MATERIALS

FIELD OF THE INVENTION

The present invention relates to high-density ballast materials, which possess improved transparency within certain regions of the electromagnetic spectrum.

BACKGROUND INFORMATION

Some types of aircraft components require specifically shaped and placed high-density materials (ballast) to meet center-of-gravity and/or moment-of-inertia requirements. Conventional ballast materials comprise high-density metals. Tungsten is the most often used metal for ballast due to its very high density, availability and low cost. However, existing high-density ballast materials are incompatible with radar absorbing composite structures (RAS) because they are opaque in the RF spectrum causing RF energy to be reflected in stead of being absorbed: These existing materials severely limit the RF performance of components, which require ballast.

An approach for producing a material that is both highly dense and RF transparent is to encapsulate a high-density metal powder in a low dielectric resin. This results in a high-density dielectric compound (although less dense than pure metals). While this approach enables the incorporation of a ballast material into RAS designs, the resulting component electrical performance is limited due to the dependency of performance on the dielectric properties of the constitutive materials. Typically, the lower the dielectric properties, the better a RAS system performs. The encapsulated metal powder compounds (materials) are non-conductive, they tend to have relatively high dielectric properties, which limits the performance of the RAS system. Such metal powder-based composites are also extremely dependent on particle shape. The particles must be near spherical to achieve a low composite dielectric at high loadings. Production of near spherical powders is often difficult and tends to be very expensive.

The present invention has been developed in view of the foregoing, and to address other deficiencies of the prior art.

SUMMARY OF THE INVENTION

When an aircraft component has to act both as ballast and as radar absorbing structure (RAS), a unique set of material property requirements is required. To fulfill these dual requirements a material has to be both substantially transparent to radar and dense. The present invention provides a unique approach to meet these dual requirements which are normally mutually exclusive.

The present high density, low epsilon ballast materials allow for significant RF attenuation for aircraft components requiring ballast materials. This is made possible in accordance with the present invention through the use of a high-density compound that is RF transparent enough to be compatible with RAS.

An aspect of the invention is to provide a high density, low epsilon ballast material comprising dielectric ceramic particles in a polymeric matrix.

Another aspect of the invention is to provide a method of making a high density, low epsilon ballast material including the steps of mixing dielectric ceramic particles with a resin, and curing the resin to form a composite material comprising the dielectric ceramic particles in a matrix of the cured resin.

These and other aspects of the present invention will be more apparent from the following description.

DETAILED DESCRIPTION

Figure 1:
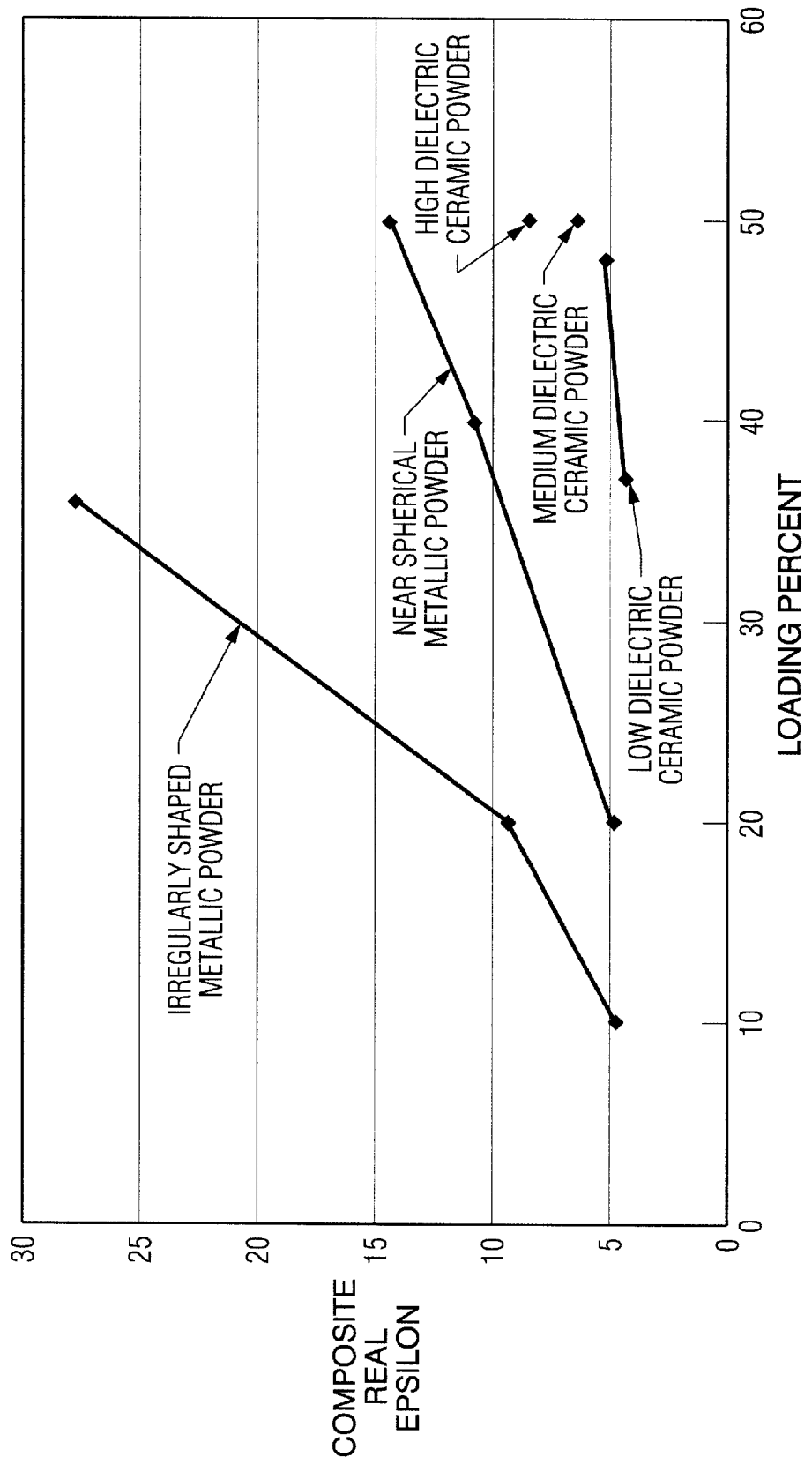
FIG. 1 is a graph composite epsilon values versus particulate loading for ceramic-containing materials of the present invention in comparison with conventional metal-containing materials.

A primary feature of the ballast materials of the present invention is the inclusion of relatively high-density dielectric ceramics into low dielectric polymer resins that are compatible with current aerospace requirements. An important feature of the present invention is the use of ceramic powders in the formulation. If slightly higher densities are needed than can be achieved with the ceramic powder-based composites, conventional higher density metal powders can be mixed in with the ceramics. The dielectric values for the metal/ceramic mixtures will be lower than for the straight metal powders. In addition, semiconductor particulate such as SiC fibers may be added to the mixtures to add dielectric loss to the composite. In addition to the high-density ceramics, high-density metallics and semi-conducting fibers may also optionally be added to achieve the desired densities and electrical properties.

The present high density, low epsilon ballast materials preferably comprise at least about 30 volume percent dielectric ceramic particles in a polymeric matrix. The dielectric ceramic particles preferably comprise at least one material selected from oxides, sulfides, fluorides, nitrides, and borides. Specific dielectric ceramic materials include PbO, PbS, HgS and Ti2O3. Particularly preferred dielectric materials include HgO and WO2.

The polymeric matrix preferably comprises at least one resin selected from epoxies, urethanes, silicones, and Teflon. Specific resins include PFA Teflon and Ciba Geigy Urethane 5754. Teflon, polytetrafluoroethylene, is a trademarked product of the Dupont Company. PFA Teflon is Teflon with perfluoro (alkyl vinyl esters). Urethane 5754 is a low dielectric urethane produced by the Ciba Geigy Corporation.

The dielectric ceramic particles preferably comprise from about 30 to about 50 volume percent of the material. More preferably, the dielectric ceramic particles comprise from about 35 to about 40 volume percent of the material.

The dielectric ceramic particles preferably have an average size of from about 5 to about 100 microns, more preferably, from about 10 to about 20 microns. The dielectric ceramic particles are substantially uniformly dispersed throughout the polymeric matrix.

In addition to the dielectric ceramic particles, the present high density, low epsilon ballast materials may optionally include metallic particles. Suitable metallic particles include W, Re, Pb and Os. Such metallic particles may comprise from about 20 to about 40 volume percent of the material.

Semiconductor particles may also optionally be added to the present materials. Suitable semiconductor particles may comprise materials such as SiC, C and BN. Such semiconductor particles may comprise from about 0.5 to about 2 volume percent of the material.

In accordance with the present invention, the overall dielectric properties of the material are relatively low. The material preferably has a composite epsilon value of less than about 5.0. More preferably, the material has a composite epsilon value of less than about 4.0.

The dielectric ceramic materials which are used in the ballast materials of the present invention preferably have an epsilon value of from about 5 to about 20. More preferably, the dielectric ceramic material has an epsilon value of from about 5 to about 10.

In accordance with the present invention, the ballast materials are of relatively high density, typically greater than about 5 g/cc. Preferably, the material has a density of greater than about 6 g/cc, more preferably greater than about 7 g/cc.

The present ballast materials preferably have combined dielectric and density properties superior to conventional materials. For example, the present materials have composite epsilon values of less than about 10 and a density of greater than about 5 g/cc. More preferably, the materials have a composite epsilon value of less than about 5.5 and a density of greater than about 5 g/cc. In a preferred embodiment, the ballast material has a density/dielectric ratio of greater than about 2.0. More preferably, the ballast material has a density/dielectric ratio of greater than about 1.1.

The present high density, low epsilon ballast materials may be made by mixing the desired amount and type of dielectric ceramic powder with a resin, followed by curing the resin to form a composite material comprising the dielectric ceramic particles in a matrix of the cured resin. Curing may be accomplished by any suitable technique such as heating, UV radiation and the like. For example, the ceramic/resin powder mixture may be formed to any desired shape and heated at a temperature of from about 20 to about 30 degrees C. for from about 12 to about 24 hours to cure the resin component. Alternatively, some types of resins may be cured at room temperature.

FIG. 1 shows loading percent versus composite dielectric properties of several conductive metallic powders in comparison with the present high density ceramic-containing materials. Composition #1 a irregularly shaped metallic powder which has a Tungsten powder filler—Kulite ~5 micron diameter powder with a two part dielectric urethane resin (preferably Ciba Geigy 5753) loadings of 10, 20 and 40 volume percent. Micrographs of powder showed particle clumping and irregular shapes. Composition #2 near spherical metallic powder which has carbonyl iron powder filler –3 micron diameter powder with a two part dielectric urethane resin (preferably Ciba Geigy 5753) loadings of 50 volume percent. Composition #3 a high dielectric powder which has a lead oxide powder filler with a two part dielectric urethane resin and a loading 50 volume percent. Composition 4 medium dielectric powder with an iron oxide powder filler with a two part dielectric urethane resin and a loading 50 volume percent. Composition 5 low dielectric powder which has a mercuric oxide filler with a two part low dielectric urethane resin and a loading at 37 and 48 volume percent. The differences shown between the different metals are due to powder shape.

FIG. 1 illustrates that the non-conductive ceramic powders can be loaded at much higher volume percents while keeping composite dielectric values relatively low.

Figure 2:
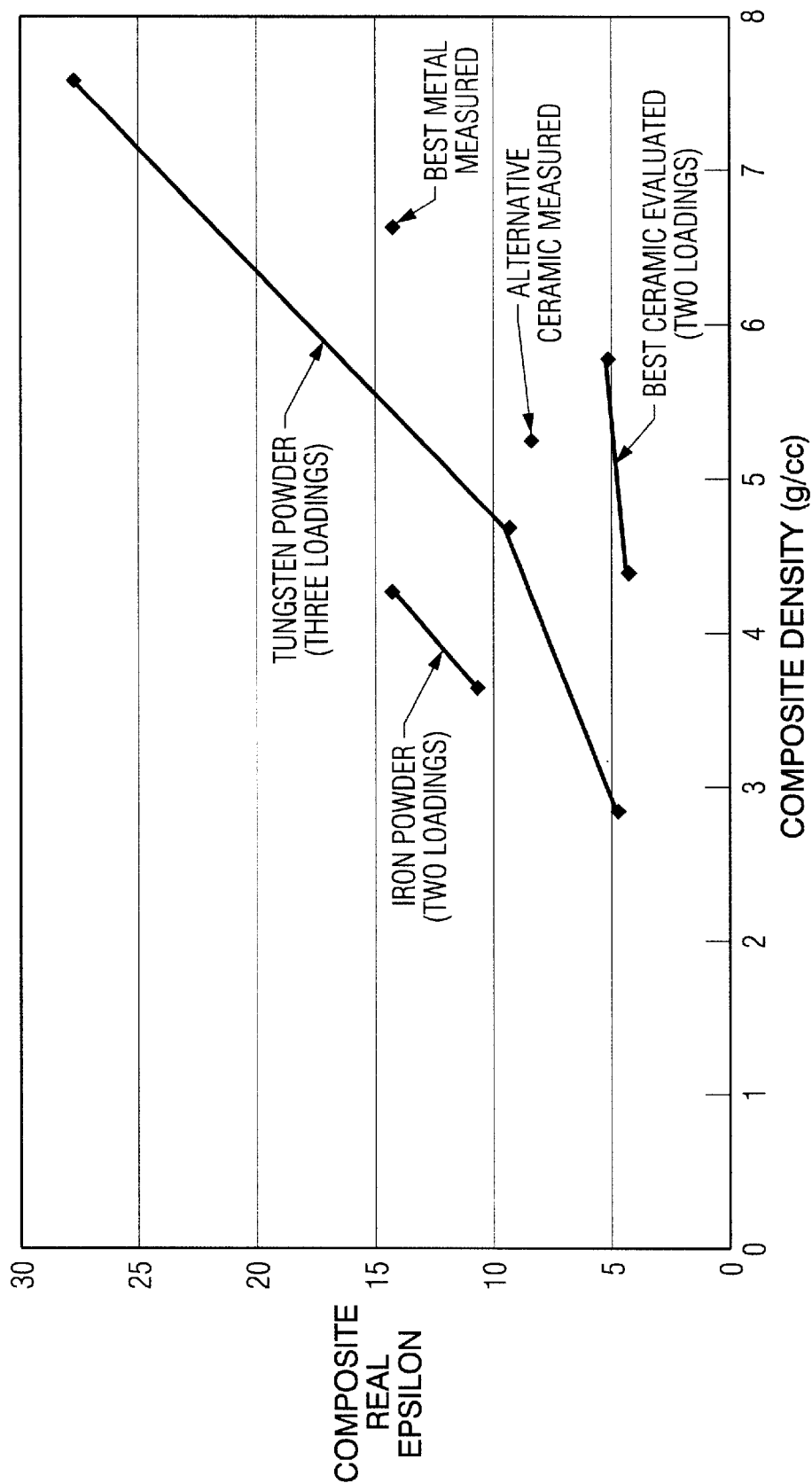
FIG. 2 is a graph of composite epsilon values versus composite density for ceramic-containing materials of the present invention in comparison with conventional metal-containing materials.

FIG. 2 shows composite density versus dielectric properties of several metallic and non-metallic based compounds. Composition #1 Tungsten powder—a Tungsten powder filler—Kulite 105 –5 micron diameter powder with a two part dielectric urethane resin (preferably Ciba Geigy 5753) and loadings of 10, 20 and 40 volume percent, Micrographs of powder showed particle clumping and irregular shapes. Composition # Iron powder—a Carbonyl iron powder filler ~3 micron diameter powder and with a two part low dielectric urethane resin (preferably Ciba Geigy 5753) and loadings of 20, 40 and 50 volume percent. Micrographs of powder showed most particles to be near spherical in shape. Composition #3 Alternative Ceramic Powder (Lead Oxide)—a Lead Oxide powder filler and a two part low dielectric urethane resin and loading of 50 volume percent. Composition #4 Best metal measured—a Tungsten powder filler from Ostram with a two part low dielectric urethane resin with a loading of 40 volume percent. Composition #5 Best Ceramic Evaluated—a Mercuric Oxide filler with a two part low dielectric urethane resin and a loading at 37 and 48 volume percent.

All compositions were made by simple hand mixing of powders into base urethane component. The catalyst component was then mixed in and resulting slurry was made into waveguide molds for measuring dielectric properties and density coupons. Values shown on charts and Figures are based upon actual measured dielectric and density values.

FIG. 2 shows that even though the ceramics are less dense than the metallic powders, the overall composite density/dielectric ratio is improved with the ceramic powders. The present ceramic powders have the further benefit of not being dependent on particle shape.

Whereas particular embodiments of this invention have been described above for purposes of illustration, it will be evident to those skilled in the art that numerous variations of the details of the present invention may be made without departing from the invention as defined in the appended claims.

What is claimed is:

1. A high density, low epsilon ballast material comprising at least about 30 volume percent dielectric ceramic particles in a polymeric matrix, wherein the material has a composite epsilon value of less than about 7 and a density of greater than about 5 g/cc.

2. The material of claim 1, wherein the dielectric ceramic particles comprise oxides, sulfides, fluorides, nitrides and/or borides.

3. The material of claim 1, wherein the dielectric ceramic particles comprise PbO, PbS and/or HgS.

4. The material of claim 1, wherein the dielectric ceramic particles comprise HgO and/or $WO_2$.

5. The material of claim 1, wherein the polymeric matrix comprises epoxies, urethanes, silicones, and/or polytetrafluoroethylene.

6. The material of claim 1, wherein the polymeric matrix comprises polytetrafluoroethylene with perfluoro(alkyl vinyl esters) and/or low dielectric urethane resins.

7. The material of claim 1, wherein the dielectric ceramic particles comprise from about 30 to about 50 volume percent of the material.

8. The material of claim 1, wherein the dielectric ceramic particles comprise from about 35 to about 40 volume percent of the material.

9. The material of claim 1, wherein the dielectric ceramic particles have an average size of from about 5 to about 100 microns.

10. The material of claim 1, wherein the dielectric ceramic particles have an average size of from about 10 to about 20 microns.

11. The material of claim 1, wherein the dielectric ceramic particles are substantially uniformly dispersed throughout the polymeric matrix.

12. The material of claim 1, further comprising metallic particles.

13. The material of claim 12, wherein the metallic particles comprise W, Re, Os and/or Pb.

14. The material of claim 12, wherein the metallic particles comprise from about 20 to about 40 volume percent to the material.

15. The material of claim 1, further comprising semiconductor particles.

16. The material of claim 15, wherein the semiconductor particles comprise, SiC, C and/or BN.

17. The material of claim 15, wherein the semiconductor particles comprise from about 0.5 to about 2 volume percent of the material.

18. The material of claim 1, wherein the material has a composite epsilon value of less than about 5.

19. The material of claim 1, wherein the dielectric ceramic particles have an epsilon value of from about 5 to about 20.

20. The material of claim 1, wherein the dielectric ceramic particles have an epsilon value of from about 5 to about 12.

21. The material of claim 1, wherein the material has a density of greater than about 6 g/cc.

22. The material of claim 1, wherein the material has a density of greater than about 7 g/cc.

23. The material of claim 1, wherein the material has a composite epsilon value of less than about 6.

24. The material of claim 1, wherein the material has a composite epsilon value of less than about 5.

25. The material of claim 1, wherein the material has a density/dielectric ratio of greater than 0.9.

26. The material of claim 1, wherein the material has a density/dielectric ratio of greater than 1.1.

27. A method of making a high density, low epsilon ballast material comprising:

mixing dielectric ceramic particles with a resin; and curing the resin to form a composite material comprising the dielectric ceramic particles in a matrix of the cured resin, wherein the material has a composite epsilon value of less than about 7 and a density of greater than about 5 g/cc.

* * * * *